Patented Oct. 18, 1932

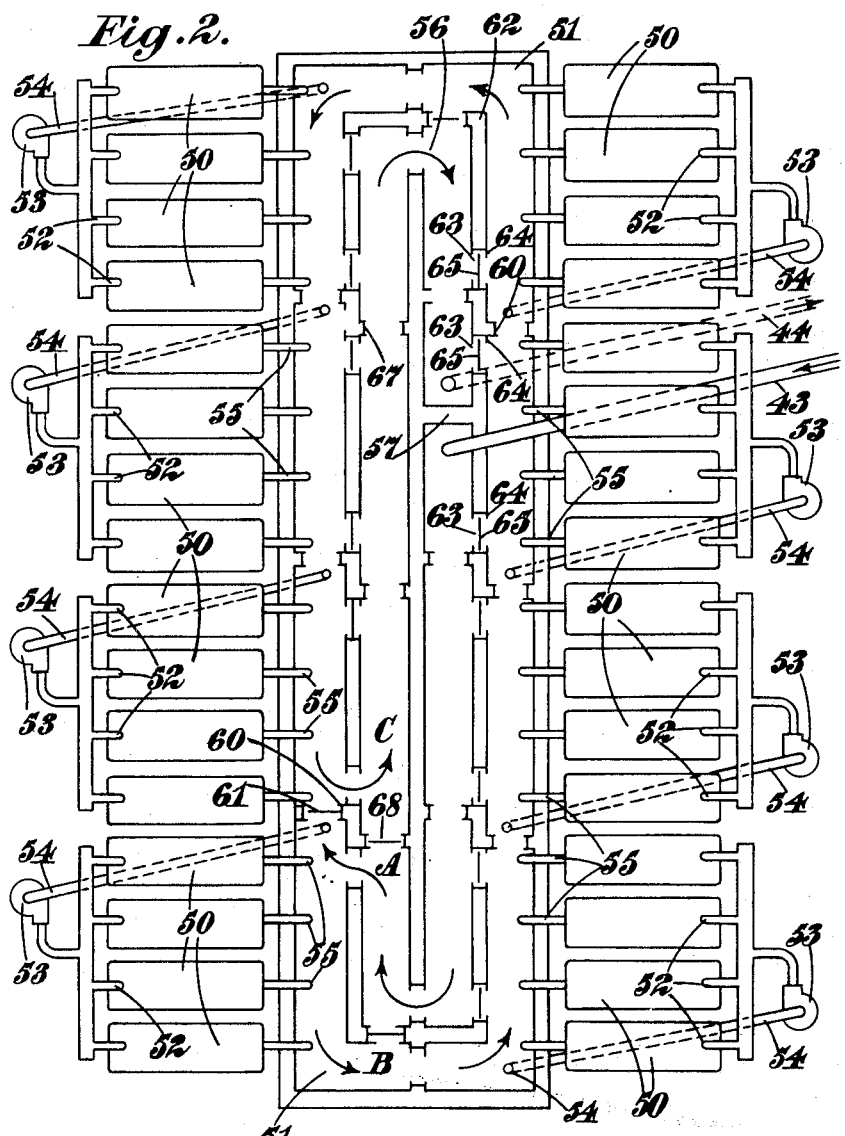
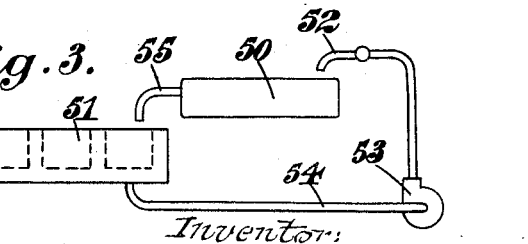

1,882,669

UNITED STATES PATENT OFFICE

ALEXANDER GRANT McGREGOR, OF LONDON, ENGLAND

LIQUID CIRCULATING PLANT

Original application filed May 4, 1928, Serial No. 275,081. Divided and this application filed February 21, 1930. Serial No. 430,388.

This invention comprises improvements in liquid-circulating plant and has more particular reference to such plant when employed for electrolytic plants where the electrolyte has to be circulated through large batteries of cells.

This application is a divisional from my application Serial No. 275,081 filed May 4th, 1928.

It is an object of the invention to provide a flexible circulating system which is capable of enabling liquid to be circulated through a battery of tanks in series without necessitating that the rate of flow through each tank should be identical with the rate of flow through the remainder. Another object of the invention is to provide a circulating system adapted for operation on the countercurrent principle. Another object of the invention is to provide a circulating system which enables one or more of the cells through which liquid is to be circulated to be cut out of operation for cleaning, refilling or repairs while permitting all the other units of the system to remain in normal operation.

According to one feature of the present invention there is provided in plant comprising a battery of electrolytic tanks and apparatus for circulating liquid therethrough, the combination with the tanks of a manifold-conduit having inlet connections and outlet connections in parallel to the tanks, means to induce circulation between the tanks and manifold through the inlet and outlet connections, and means to feed liquid for circulation to the system at one end of the series of tanks and to withdraw liquid from circulation at the other end of said series. In this manner it is possible to circulate the liquid a number of times through any one tank and if desired a different number of times through another tank without in any way interfering with the regular flow of liquid through the system which takes place through the manifold. In fact although the liquid is circulated through the tanks in series there is no interruption to the circulation if one or more tanks has to be cut out of action.

According to a further feature of the present invention there is provided in plant comprising a battery of electrolytic tanks and apparatus for circulating liquid therethrough the combination with the tanks of a ring manifold-conduit having inlet connections and outlet connections in parallel to the tanks, means to interrupt the manifold at will at any one of a plurality of points situated respectively between adjacent tanks, means to induce circulation between the tanks and manifold through the inlet and outlet connections, and means to feed liquid for circulation to the system at one side of the point of interruption of the manifold and to withdraw liquid from circulation at the other side of that point. The term "ring manifold" is intended to include either a conduit which is self-closed by the ends being directly joined together, or one in which the ends are united by other means, for example a pipe or the like with or without means therein to ensure circulation of fluid therethrough, the essential characteristic being that it shall be possible for liquid to circulate from any one point in the conduit to any other notwithstanding that the conduit may be interrupted, as for example by a gate across it at some one point. By this means the battery of tanks can be divided into a series which begins with any one tank in the battery and all the remaining tanks will then receive liquid in series after it has had access to the initial tank beyond the point of interruption. The manifold may be either an open channel or launder or a pipe or the like.

In this electrolytic plant, in addition to the advantages of flexibility in circulation, an increase in efficiency is obtainable as hereinafter described.

The accompanying drawings illustrate one embodiment of the invention by way of example.

In the drawings:—

Figure 2 is an enlarged diagrammatic plan of an electrolytic plant, and

Figure 3 is a corresponding cross-section therethrough.

Figure 1:
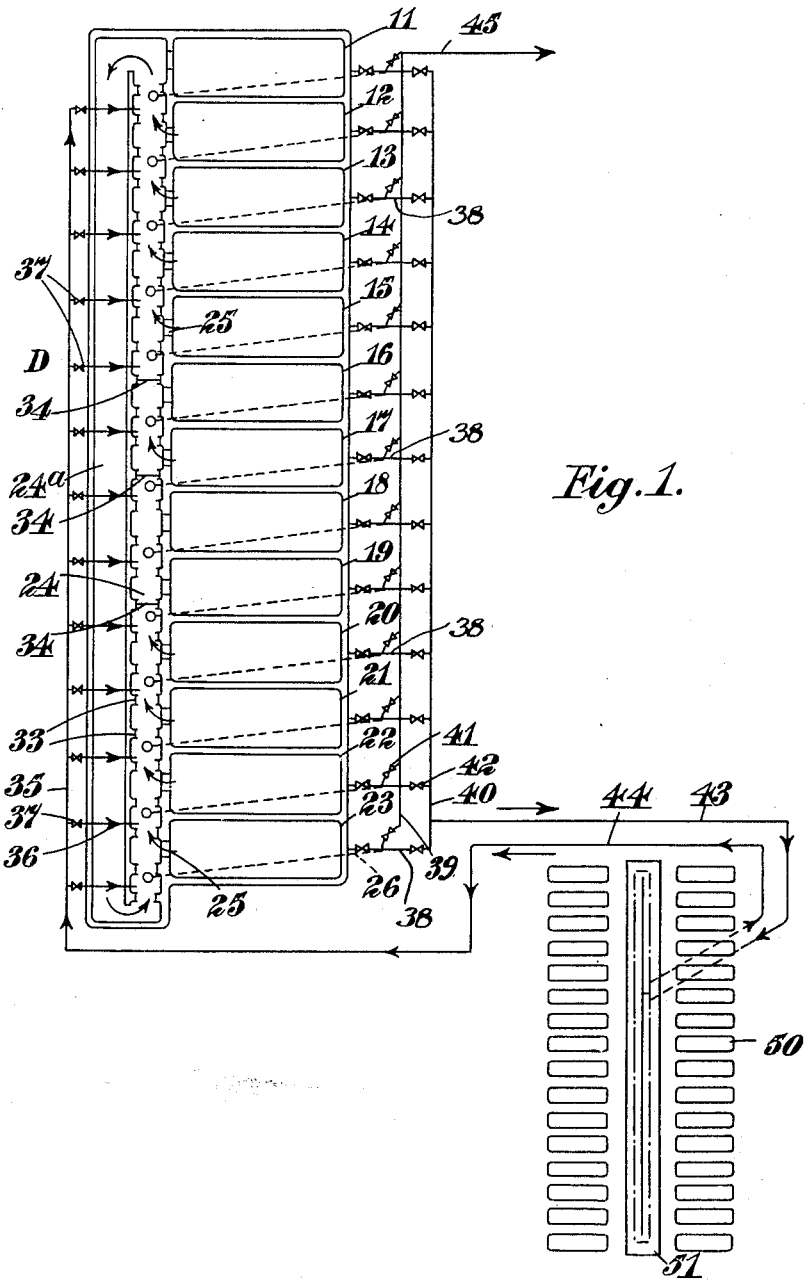
Figure 1 is a diagram of the general arrangement of a combined leaching and electrolytic plant.

It will be understood that the various figures are not drawn to scale, the control means being magnified for the purpose of rendering the details clear.

Referring to Figure 1, this shows a battery of leaching tanks arranged side by side and numbered serially 11 to 23 inclusive. These leaching tanks may be as large as desired or necessary to contain, say, one day's charge of ore so that one tank in the battery can be freshly brought into use each day, a tank of spent ore being simultaneously cut out of the system for emptying. Along the head ends of the tanks there extends a manifold in the form of an open channel 24, the ends of which are in communication with and are united by a return channel 24a so that the whole constitutes a ring or endless conduit. At intervals opposite each tank the manifold channel 24 is provided with openings in the bottom connected to circulation pipes 26 which pass beneath the tanks to the ends remote from the manifold 24, where they enter the tanks at the bottom through control valves 27. The tanks 11 to 23 are provided with false bottoms on which the material to be leached rests. Between the top of each tank and the channel 24 is a weir-opening 25. Each of the pipes 26 is provided with a rotating impeller, not shown in the drawings, to induce flow of liquid therethrough.

The channel 24 is provided along its sides with a number of vertical slideways 33 which are adapted to receive removable cross-gates 34. As can be seen from inspection of Figure 1, slides to receive a cross-gate are provided between each of the pipes 26 and each of the weirs 25. The weirs 25 are made adjustable in height by removable slats.

A leaching liquor supply main 35 extends along the side of the ring manifold 24, 24a and is provided with branches 36 controlled by valves 37. Each branch delivers into the manifold adjacent to the end of one of the pipes 26.

In addition to the connection of the pipes 26 with the bottoms of the tanks 11 to 23 they have branches 38 which connect them with two draw-off mains 39, 40. The connection of each pipe 36 with the main 39 is controlled by a valve 41 and its connection with the draw-off main 40 is controlled by a valve 42. The draw-off main 40 is connected by a pipe 43 to the electrolytic cells. The return pipe 44 from the electrolytic cells is connected to the supply-main 35. The draw-off main 39 is intended for wash water and is connected by a pipe 45 with plant, not shown, for dealing with such wash water. For delivery of wash water to the apparatus a suitable main provided with branches for delivery to the manifold 24 can be provided, but is not shown for the sake of clearness.

The electrolytic plant comprises a battery of electrolytic cells 50 which are supplied with electrolyte from a distributing channel 51 supplied by and delivering to the pipes 43, 44. The arrangement is shown in detail in Figure 3.

The cells 50 are disposed in groups of four each having electrolyte-supply pipes 52 at one end which are connected to the delivery of a centrifugal pump 53 the inlet of which is connected by a pipe 54 of the distributing manifold channel 51. The electrolytic cells have outlets 55 which deliver into the said channel. The outlets 55 take the form of open channels with weirs (not shown) between them and the tanks 50 so that the level in the tanks of the electrolyte can be adjusted. Thus each group or section of four of the cells 50 is operated in parallel one with another. The channel 51 is a ring-conduit, that is to say, its ends are joined to itself, as shown in Figure 3 and it follows a rectangular course. Within the channel 51 is a second conduit 56 which extends alongside the channel 51 throughout its length but the continuity of which is broken by a transverse partition 57 at one point. The pipes 43, 44 are connected to the inner conduit 56 one on one side and one on the other of the partition 57.

Between each section of the cells 50 the channel 51 is provided with vertical guides 60 to receive removable cross-gates 61. Adjacent to each of the guides 60 and at either side thereof the wall 62 between the channels 51 and 56 is pierced by passages 63 having vertical guides 64 to receive removable gates 65. The channel 56 is also provided with vertical guides 67 at intervals opposite to the connections of the pipes 52 with the manifold 51 to receive removable cross-gates 68. All the cross-gates are made of the same size and interchangeable with one another.

In operation the plant above described is intended to be used in the leaching of valuable contents from ores or the like by the passage through ore located in the leaching tanks 11 to 23 of suitable solvent solution, which when sufficiently enriched by contact with the ore is carried to the electrolytic cells and the metal content of the solution therein deposited and recovered while the solution is regenerated and in its regenerated condition returned to the leaching tanks.

In considering the operation of the plant in detail it will be convenient to begin with the electrolytic cells. The enriched solution from the leaching tanks enters the inner conduit 56 by way of the pipe 43 and, assuming for example that the gates are set in the position indicated in the drawings, the solution will pass around the conduit 56 until it encounters the first cross-gate 68 set across the same, as shown at the point A in the drawings. The gate 65 in the wall 62 has at this point been removed and the leaching solution therefore passes out into the manifold conduit 51. The pump 53 of the adjacent section of the cells 50 being in operation, the bulk of the entering electrolyte or leaching solution will be drawn through the conduit 52 from the manifold 51 and delivered to the cells 50 from which it returns through the pipe 52 to the manifold 51. If the pump 53 is operated rapidly a rapid circulation will be set up, the rate of which is independent of the rate of entry of fresh leaching solution at A. Consequently the electrolyte may be circulated one or more times through the cells, or it may be circulated insufficiently fast for the whole of it to be drawn in through the pipe 52 so that some of it passes on directly to the next section of cells. All these results are under the immediate control of the operator by varying the speed of the pump 53.

A net quantity of electrolyte equal to that entering at A passes on beyond the cells of the first section of the series to the next cells, as shown by the arrow B and here it is further subjected to circulation and electrolysis. The operation is repeated through the remaining cells of the series and finally spent electrolyte having passed completely round the manifold 51 re-enters the inner conduit 56, as shown by the arrow C and passes around it to the outlet pipe 44.

In the operation of the cells it is arranged that all the cathodes in each one of the eight groups of cells are of substantially the same age. The cathodes in the group of cells on to which the electrolyte is first directed will be one day old, in the next group two days old and in the last group eight days old. By means of the weirs in the outflow conduits 55, the solution is arranged to be at its highest when the cathodes are first placed in the cells and to be slightly lowered each day. This prevents local action between the electrolyte and the cathode plate at the electrolyte surface from eating away the supports of the cathode.

Fresh electrolyte entering the battery of cells is not very corrosive and therefore when the fresh electrolyte is directed on to the new plates, as above described, although these are thin they will not be eaten away. As the plating progresses the supports or loops of the cathode sheets at the electrolyte surface become thicker owing to deposition of copper and so when the electrolyte level is lowered at a subsequent stage of electrolysis the portion of the cathode exposed to the corrosive action at the electrolyte surface is thicker than a new cathode and although at this stage the electrolyte is more corrosive it is unable to weaken the supports sufficiently to give trouble. It will be seen that the more corrosive the solution becomes the thicker is the cathode support or loop which is exposed to it. When electrolysis in a given cell has proceeded to such a point that the cathodes require renewal and replacement, this is effected by changing a few cathodes from the cell at a time and allowing the current to flow during the changing through the remaining cathodes. The cell is at no time cut completely out of operation, and circulation of the electrolyte proceeds continuously in all the cells.

In order that the advantages of the described arrangement may be appreciated, it is convenient to take a concrete example of the electrolysis of copper sulphate derived from leaching a copper sulphide ore with sulphuric acid. Such ores commonly contain iron which enters into solution as ferrous sulphate and even if the ore does not naturally contain iron it is desirable for reasons hereinafter pointed out that some iron should be introduced into the solution as the efficiency of the leaching action is thereby increased. In the electrolysis of copper from an electrolyte containing ferrous sulphate some of the latter is oxidized to the ferric state. Ferric sulphate being a very active solvent of copper causes undesirable local action upon the deposited copper with a corresponding loss of current efficiency. Now, if as is the general practice, the electrolytic cells are all arranged in parallel so as to receive the same kind of leaching solution as one another each cell will always contain the same content of ferric sulphate as its neighbours. Since conditions in the leaching plant necessitate the supply of an electrolyte having a high content of ferric sulphate it will inevitably result that a considerable amount of local action will occur in every cell. Moreover the high percentage of ferric iron in the cells leads to a spongy deposit of copper. These disadvantages are overcome according to my invention in several ways:—

In the first place the efficiency can be increased, notwithstanding the presence of ferric sulphate, by increasing the rapidity of circulation of the electrolyte and this is done independently of the rate at which fresh electrolyte is introduced to the circuit. In the second place, the cells are operated not in parallel with one another but in series, that is to say the cell at A in the drawings is receiving fresh electrolyte. It will therefore be working at a high efficiency since ferric iron will be low in amount. Subsequent cells will work with gradually increasing amounts of ferric iron, but even the last cell has no more ferric iron present than have all the cells in the case of parallel operation, so that the average current efficiency is higher. In the third place, it is possible, by suitably operating the gates 61, 65 and 68 to direct fresh solution for a short time on to the last cell in the circuit before replacing the cathodes by new ones. This has the effect of covering any spongy iron deposit produced in the last stages with a layer of dense copper which protects it from loss or crumbling off in subsequent handling and transportation.

Similar problems arise in the leaching and electrolysis of other materials with different electrolytes and my apparatus yields in such cases parallel advantages to those above described for the case of copper sulphate electrolysis.

The outgoing solution from the electrolytic cells through the pipe 44 is high in ferric iron and in sulphuric acid but low in copper sulphate. It is therefore an efficient solvent for copper sulphide, the ferric iron considerably assisting its solvent properties. Leaching then takes place in the manner described in my aforesaid co-pending patent application No. 275,081.

It will be observed that the described operations can all be carried out with a minimum of labour so that operating expense of the plant is reduced, and that the operations in the leaching and electrolytic plants are arranged to fit in one with the other so that the process goes on continuously and cyclically, while a break down of any one unit does not interfere with the general operation of the plant.

I claim:—

1. In an electrolytic plant, the combination of a battery of electrolytic cells, a ring-manifold having inlet connections and outlet connections to the said cells in parallel, means to induce circulation between the cells and the manifold through said connections, means to interrupt the manifold at will at any one of a plurality of points situated respectively between adjacent cells, a second ring-conduit alongside said manifold, an inlet thereto and an outlet therefrom close together in the conduit but separated by a break in the continuity of the conduit, a plurality of passages for fluid and control means therefor between the second conduit and various points in the length of the manifold to act as inlets and outlets to said manifold, and means to interrupt said second conduit at will at a plurality of points between said passages to divide it into inlet and outlet sections.

2. In an electrolytic plant, the combination of a battery of electrolytic cells in sections, a ring-manifold in the form of an open channel in sections corresponding to the cell-sections, removable cross-gates for interrupting the channel at will at various points between said sections, draw-off and return connections between the sections of the manifold and corresponding sections of cells, a second ring-channel alongside the manifold, an inlet thereto, an outlet therefrom adjacent to but separated from the inlet, a plurality of passages for fluid between the two channels at various points in their length, removable cross-gates to control the said passages, and removable cross-gates for interrupting the said second channel between said passages at will to divide it into an inlet section and an outlet section.

3. An electrolytic plant as claimed in claim 2, wherein the cross-gates for the two channels and the passages between them are interchangeable, for the purpose described.

4. An electrolytic plant as claimed in claim 2, wherein independently variable means are provided for inducing circulation between each cell-section and the ring manifold.

5. A process for the electro-deposition of copper from solutions containing iron consisting in renewing in rotation the cathodes of a series of battery cells through which the electrolyte is circulated cell by cell successively, and so corelating the renewal of the cathodes with the circulation of the electrolyte that when new cathodes are inserted in a given cell, the circulation of fresh low ferric electrolyte is changed so as to begin at that cell and to proceed through the cells in the inverse order of the newness of the cathodes and to end as spent high ferric electrolyte at one of the cells having a relatively old cathode, and successively lowering the level of the electrolyte in each cell at each change of circulation which brings the cathode thereof into contact with more spent electrolyte having a higher content of ferric iron.

In testimony whereof I have signed my name to this specification.

ALEXANDER GRANT McGREGOR.